(12) United States Patent
Stefan (10) Patent No.: US 10,185,319 B2
(45) Date of Patent: Jan. 22, 2019

(54) METHOD AND DEVICE FOR ASSISTING A PARKING MANEUVER

(71) Applicant: FORD GLOBAL TECHNOLOGIES, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/340,900

(22) Filed: Nov. 1, 2016

(65) Prior Publication Data
US 2017/0139415 A1    May 18, 2017

(30) Foreign Application Priority Data

Nov. 16, 2015 (DE) .................. 10 2015 222 526

(51) Int. Cl.
*G05D 1/00* (2006.01)
*B62D 15/02* (2006.01)
*G05D 1/02* (2006.01)

(52) U.S. Cl.
CPC ....... *G05D 1/0088* (2013.01); *B62D 15/0285* (2013.01); *G05D 1/0221* (2013.01); *G05D 1/0223* (2013.01)

(58) Field of Classification Search
None
See application file for complete search history.

(56) References Cited

U.S. PATENT DOCUMENTS

| 9,205,838 | B2 | 12/2015 | Moore et al. | |
|---|---|---|---|---|
| 2004/0020701 | A1* | 2/2004 | Aoki | B60R 21/0136 180/274 |
| 2007/0282504 | A1* | 12/2007 | Luke | B62D 15/028 701/44 |
| 2011/0004375 | A1* | 1/2011 | Hueger | B62D 15/0285 701/41 |
| 2011/0080305 | A1* | 4/2011 | Toledo | B62D 15/028 340/932.2 |
| 2011/0288727 | A1* | 11/2011 | Krautter | B62D 15/027 701/41 |
| 2012/0197492 | A1* | 8/2012 | Schneider | B62D 15/028 701/41 |

(Continued)

FOREIGN PATENT DOCUMENTS

| DE | 102007061234 A1 | 6/2009 |
|---|---|---|
| DE | 102009003216 A1 | 11/2010 |

(Continued)

OTHER PUBLICATIONS

German Search Report dated Aug. 26, 2016 for German Application No. 102015222526.7, 7 pgs.

*Primary Examiner* — Thomas G Black
*Assistant Examiner* — Ana D Thomas
(74) *Attorney, Agent, or Firm* — Frank MacKenzie; Brooks Kushman P.C.

(57) ABSTRACT

A method and a device assist a parking maneuver. The parking maneuver is implemented at least partly in automated manner on the basis of predetermined set speed values for the motion of the vehicle. Implementing the parking maneuver includes defining at least one virtual curb, and modifying at least one set speed value during the implementation of the parking maneuver on the basis of this virtual curb.

12 Claims, 6 Drawing Sheets

(56) References Cited

U.S. PATENT DOCUMENTS

| | | | | |
|---|---|---|---|---|
| 2014/0088836 A1* | 3/2014 | Staack | .................... | B60R 1/025 701/49 |
| 2015/0035983 A1* | 2/2015 | Niemz | ............... | G06K 9/00805 348/148 |
| 2015/0329110 A1* | 11/2015 | Stefan | ................ | B62D 15/0285 701/1 |
| 2016/0207528 A1 | 7/2016 | Stefan et al. | | |

FOREIGN PATENT DOCUMENTS

| | | |
|---|---|---|
| DE | 102011118726 A1 | 5/2013 |
| DE | 102014208917 A1 | 1/2015 |
| DE | 102013220931 A1 | 4/2015 |
| DE | 102015200522 A1 | 7/2016 |
| WO | 2009077220 A1 | 6/2009 |

\* cited by examiner

METHOD AND DEVICE FOR ASSISTING A PARKING MANEUVER

CROSS-REFERENCE TO RELATED APPLICATIONS

This application claims foreign priority benefits under 35 U.S.C. § 119(a)-(d) to DE 10 2015 222 526.7 filed Nov. 16, 2015, which is hereby incorporated by reference in its entirety.

TECHNICAL FIELD

The disclosure relates to a method and a device for assisting a parking maneuver.

BACKGROUND

Conventional devices for parking assistance are designed to take over the lateral and longitudinal control of a vehicle in the course of the implementation of parking maneuvers. Parking maneuvers typically begin with a search phase, during which the dimensions of an available parking space are captured. In the case where a suitable parking space has been found, the parking-assistance device calculates a vehicle trajectory as well as suitable set values, typically for the vehicle speed and the steering angle. Finally, the respective system starts the automated control of the vehicle on the basis of the calculated set values.

In this connection, autonomous parking on a curb represents a demanding challenge. Depending on the length of the parking space and the height of the edge of the curb, the respective system must be capable of demanding additional torque for the purpose of overcoming the edge of the curb. At the same time, the respective system has to ensure an exact activation of the brakes, in order to avoid excessive speed values, for instance in the case of a tight parking space. The precise knowledge of the presence and position of curbs can therefore result in an improvement of the accuracy and comfort of a parking maneuver, in the course of which abrupt movements of the vehicle can be avoided, for example.

In principle, the respective dimensions of the parking space are captured via parking sensors which are conventionally based on ultrasound technology. The capture of curbs or such like represents a demanding challenge for conventional ultrasound-based parking sensors, in which connection the capture of a curb may also fail, depending on the type, effectiveness and orientation of such ultrasonic sensors.

From DE 10 2013 220 931 A1 a method and a device, among other things, are known for assisting the driving of a motor vehicle onto a curb, wherein a curb located in the neighborhood of the motor vehicle is captured in sensor-based manner and an automatic adaptation of the speed of the vehicle takes place during the driving onto the curb.

With respect to the further state of the art, reference is made, in exemplary manner, to DE 10 2011 118 726 A1 and DE 10 2014 208 917 A1.

SUMMARY

It is an object of the present disclosure to provide a method and a device for assisting a parking maneuver that enable an improvement of the accuracy and comfort of the parking maneuver also in the region of a curb.

A method for assisting a parking maneuver of a vehicle, wherein the parking maneuver is implemented at least partly in automated manner on the basis of predetermined set speed values for the motion of the vehicle, comprises the following steps:

defining at least one virtual curb; and modifying at least one set speed value during the implementation of the parking maneuver on the basis of this virtual curb.

By virtue of the disclosure, a method and a device are provided that enable a further development or refinement of the calculation of set values for the vehicle speed during a parking maneuver. In this connection, virtual curbs can be positioned, appropriately alternative set values for the speed can be calculated, and furthermore corresponding vehicle reactions or vehicle speeds can be estimated during the search phase in which the system is on the lookout for a parking space. The capture or ascertainment, according to the disclosure, of a curb and also the corresponding adaptation of the set speed values during the implementation of the parking maneuver take place in this case without any requirement for additional special sensors or other additional hardware components. Rather, the capture of the curb and also the adaptation of the set speed value take place on the basis of an advanced calculation and can be activated immediately during the parking maneuver.

The concept underlying the disclosure is, in particular, to define and position virtual curbs at differing positions for a given parking space and in this case to emulate differing parking scenarios (inclusive of parking positions with two or four wheels on the curb or even without wheels on the curb), wherein, in accordance with the disclosure, virtual curbs of differing height can also be predetermined.

By virtue of the method according to the disclosure, the information available by reason of the search phase in the course of the reconnoitering of the parking space is increased or supplemented by virtual curbs being positioned, wherein for each of the virtual curbs in question appropriate virtual set speed values are calculated. In this case, the calculation of the set speed values may take place as a function of the respective properties (in particular, position and height) of the virtual curb in question and, where appropriate, as a function of the dimensions of the parking space.

According to an embodiment, the number of virtual curbs can be adapted dynamically as a function of the parking situation (for example, the dimensions of the parking space, or an existing gradient of the road).

According to an embodiment, for each virtual set speed value the estimation takes place of a virtual vehicle reaction or speed to be expected. In the course of this estimation, a vehicle model, an environment model (for example, for the purpose of describing the curb) and/or software for regulating the vehicle speed may serve as a basis.

According to an embodiment, in the course of the adaptation of the vehicle speed during the parking maneuver a monitoring or observation of the current vehicle speed and a comparison of this current vehicle speed with the respective virtual vehicle reactions or speeds take place. In this case the system monitors whether a virtual vehicle reaction or speed tallies with the currently observed vehicle speed within predetermined tolerances or a predetermined criterion. If this is the case, or if there is a sufficient similarity between the virtual vehicle reaction or speed and the observed current vehicle speed, the virtual curb corresponding to this virtual vehicle speed is regarded as a real curb, and the virtual set speed value appertaining to this virtual vehicle reaction or speed is set instead of the current set speed value. In this case a gradual or gentle transition between the respective set values can be obtained via a ramp function, for example.

Moreover, in accordance with the disclosure a monitoring of the current vehicle position and a comparison of this current vehicle position with the positions of the virtual curb preferentially take place. If the observed current vehicle position is approaching a region in which a virtual curb is present, additional information for the comparison between the observed current vehicle speed and the virtual vehicle reaction or speed can be provided appropriately.

According to an embodiment, as soon as the observed current vehicle position lies beyond the position of a virtual curb the virtual curb in question and the associated virtual set speed value, as well as the associated virtual vehicle reaction or speed, can be disregarded or no longer taken into consideration by the method according to the disclosure.

In embodiments, an advance calculation of virtual curbs, of virtual set speed values and/or of virtual vehicle reactions or speeds can take place, wherein the information in question may be available via a cloud or an appropriate lookup table, for example.

The disclosure also relates, in addition, to a device for assisting a parking maneuver, wherein the parking maneuver is capable of being implemented at least partly in automated manner on the basis of predetermined set speed values for the motion of the vehicle, wherein the device has been configured to implement a method having the features described above. With respect to advantages and preferred configurations of the device, reference is made to the above remarks in connection with the method according to the disclosure.

The disclosure will be elucidated in more detail below on the basis of exemplary embodiments with reference to the appended figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
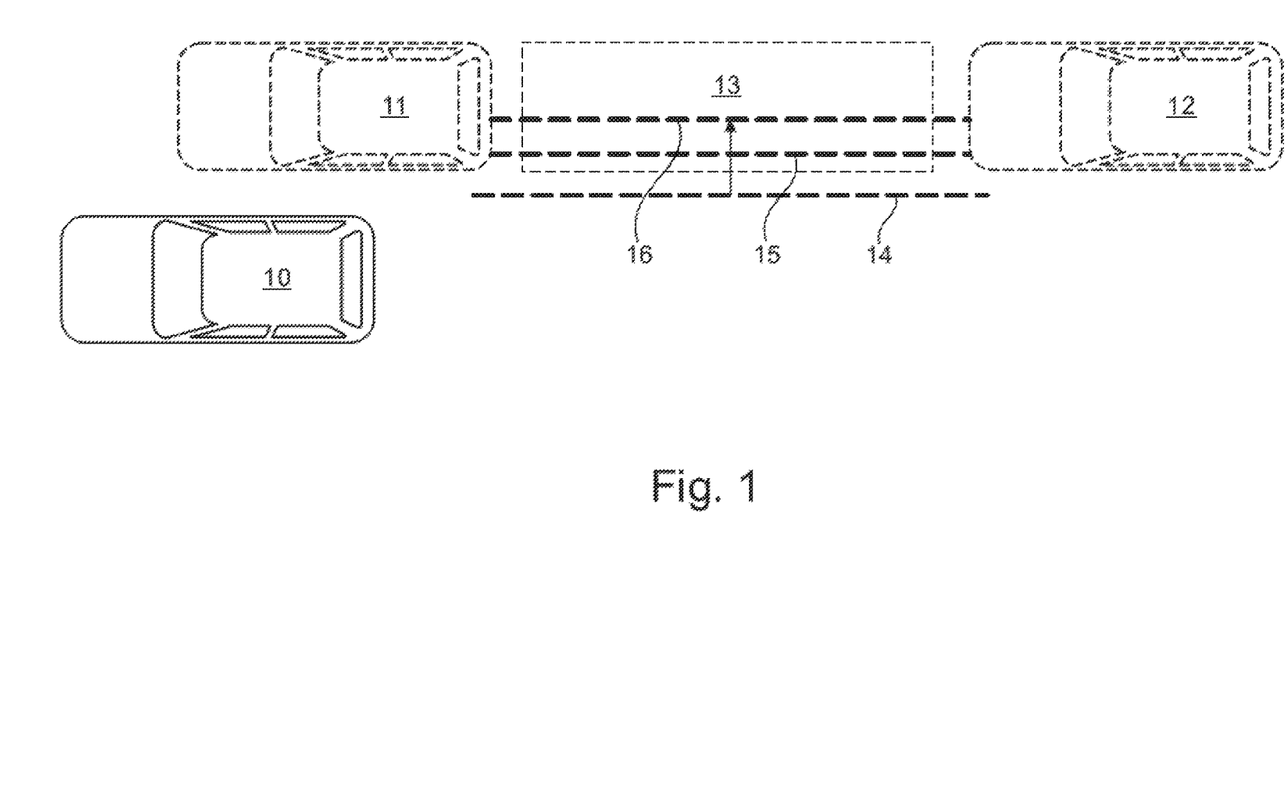
FIGS. 1, and 2A-2D are schematic representations for elucidating the possible sequence of a method according to the disclosure.

FIG. 1 serves to illustrate the positioning of virtual curbs for a vehicle 10 implementing a parking procedure.

A parking maneuver typically begins with a search phase, during which the dimensions of an available parking space are captured. The information received during this search phase makes it possible to determine the dimensions of a parking space and the position of obstacles located in the neighborhood of the parking space. For example, in the case of a parking procedure taking place parallel to the road, frontal and rear obstacles are captured. Even though reference will be made in the following to a scenario of parking into a parking space oriented parallel to the road, the method according to the disclosure is applicable to an arbitrary parking-space layout.

In this case, in accordance with the disclosure a positioning of virtual curbs can now, for example, be implemented as follows: firstly, virtual curbs having differing heights, for example 5 cm, 7 cm, 10 cm and 12 cm, are defined. In this case the virtual curbs are arranged at differing positions, beginning, for example, at a certain left-side spacing from the parking space in question, and then the virtual curbs are positioned, displaced in each instance by a predetermined increment as far as the middle of the parking space. The number of virtual curbs may in this case be chosen in a manner depending on the dimensions of the parking space.

According to FIG. 1, a parking space 13 has been discovered between extraneous vehicles 11 and 12, and, since firstly no curb whatsoever has been detected in sensor-based manner, in the exemplary embodiment three virtual curbs 14, 15 and 16 are positioned, which are each symbolized by dashed lines in FIG. 1.

The first virtual curb 14 corresponds in this case to a scenario in which the vehicle is being parked with all four wheels on the curb, whereas the other two virtual curbs 15 and 16 each correspond to a scenario in which, in each instance, only two wheels drive onto the curb. Subsequently, for each of these virtual curbs 14, 15 and 16 four differing heights are predetermined in each instance, so that finally a total of twelve virtual curbs are generated in the exemplary embodiment shown in FIG. 1.

After the generation of the virtual curbs 14 to 16—and instead of the calculation of only a single set speed value for a scenario without a curb—in accordance with the disclosure the calculation now takes place of, in each instance, an additional set speed value for each virtual curb. In this connection, here and in the following the set speed value for the case without a curb will be designated as the main set speed value, and the set speed values for the respective virtual curbs will be designated in each instance as virtual set speed values. The virtual set speed values are each dependent on the height of the curb, on the position of the curb, and on the length of the parking space 13. Accordingly, in the case where a curb is present, the set speed value should, for example, be lower for the purpose of avoiding excessive speed values. In the example shown in FIG. 1, 1+12=13 differing set speed values are consequently calculated.

After the calculation of the respective set speed values, an estimation of the respective vehicle reaction or of the respective vehicle speed takes place for each of the virtual curbs, wherein it is assumed in each instance that the vehicle 10 is striving to adjust the main set speed value. The vehicle speeds or vehicle reactions estimated in each instance for a virtual curb will be designated in the following as virtual vehicle reactions. At the end of this step, as many values for the vehicle speed or vehicle reaction have therefore been estimated as there are virtual curbs in existence (inclusive of the case in which no curb is present).

The virtual vehicle reaction is determined using a vehicle model that has been matched to the respective vehicle and to an environment model (inclusive of the virtual curb and of the dimensions of the parking space), wherein suitable software is used for controlling the vehicle speed. In the example shown in FIG. 1, 13 differing vehicle reactions or vehicle speeds are consequently calculated.

After completion of the steps described above, the parking maneuver begins, wherein firstly the main set speed value is predetermined. During the motion of the vehicle 10, the vehicle reaction or vehicle speed is monitored and compared with the respective virtual vehicle reactions or speeds, by a spacing or difference, a correlation or a tally between the captured vehicle speed and the differing virtual vehicle speeds being calculated in each instance. This comparison is implemented, in particular, at the respective real vehicle positions at which the virtual curbs were positioned. In the case where the ascertained vehicle speed tallies with one of the virtual vehicle speeds or reactions (taking a predetermined tolerance into consideration), a curb is regarded as captured or as given, and the respective set speed value is immediately replaced by the virtual set speed value corresponding to the virtual curb in question.

The virtual curbs that have been positioned at locations that the vehicle 10 has already traveled past, and also the associated virtual set values and virtual vehicle speeds, are in each instance removed and no longer taken into consideration in the course of the further maneuver. The algorithm according to the disclosure is implemented until such time as the vehicle 10 has passed all the virtual curbs.

Figure 2A:
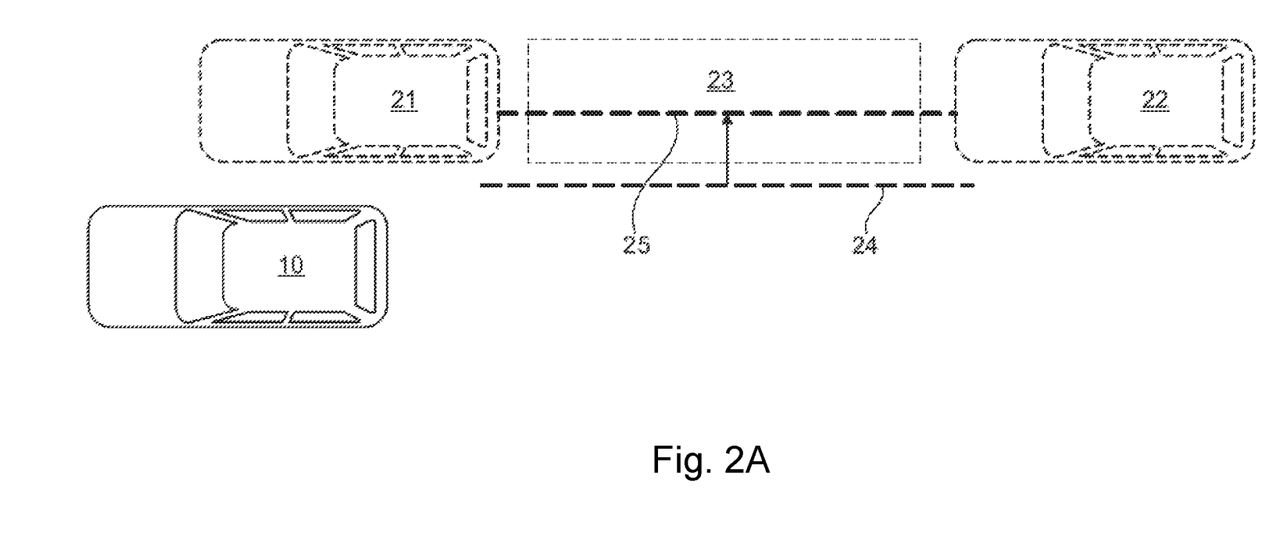

In FIG. 2A, for the sake of simplicity merely two virtual curbs 24 and 25 have been represented in the region of a parking space 23 discovered between extraneous vehicles 21 and 22.

Figure 2B:
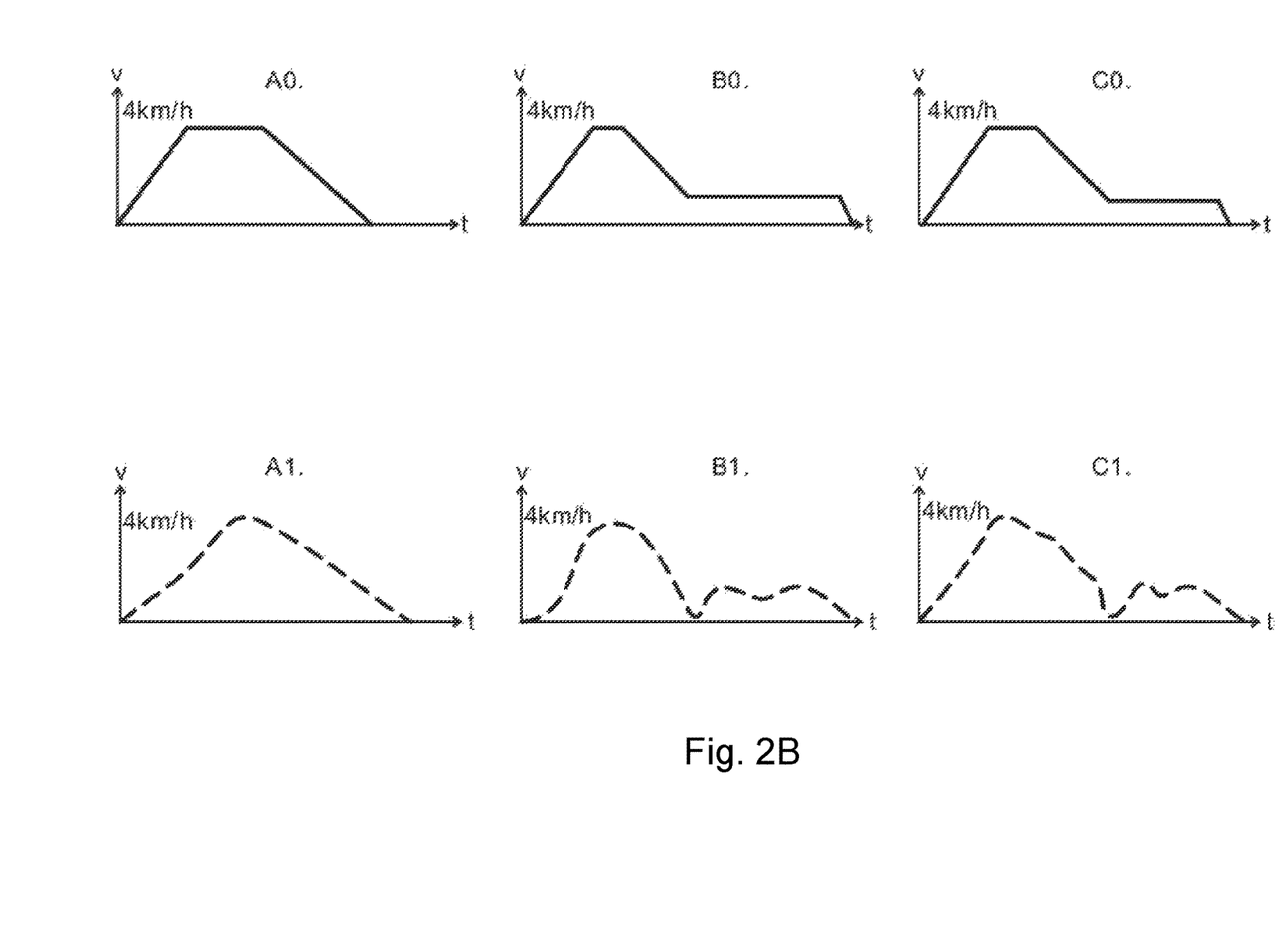

According to FIG. 2B, for each of the virtual curbs 24 and 25 a virtual set speed value (diagrams B0 and C0) and an appropriate, expected virtual vehicle reaction or speed (diagrams B1 and C1, respectively) are calculated in each instance. At the same time, an appropriate main set speed value for the case without presence of a curb (diagram A0) and also an appropriate expected main vehicle reaction or vehicle speed (diagram A1) are also calculated.

Figure 2C:
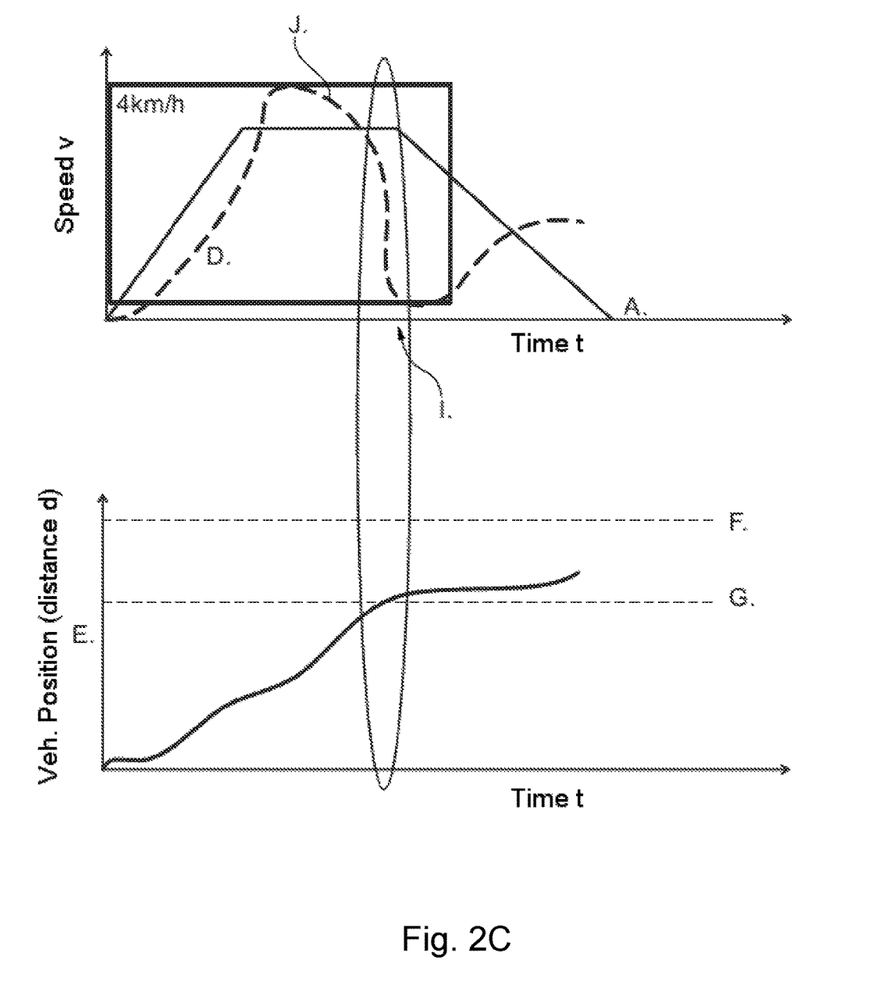

According to FIG. 2C, the parking maneuver was started by taking a set speed value A as a basis, and the current vehicle speed D and the current vehicle position E within the parking space are monitored. The current vehicle position E can be specified via the distance traveled. F and G each specify the distance traveled up until an expected contact with the virtual curbs. J denotes a monitoring window. During the maneuver, the captured vehicle speed D is compared at any time in a given monitoring window J with the respective vehicle reactions or vehicle speeds A1, B1 and C1 (both the main vehicle speed or reaction and the virtual vehicle speeds or reactions). In the present example, at time I the observed virtual vehicle speed differs too greatly from the main vehicle speed or vehicle reaction A1, and the speed observed in the observation window J tallies better with the value of the virtual vehicle speed or reaction B1. Over and above this, the observed vehicle position E is approaching the virtual curb G, as a result of which it is confirmed that the vehicle is impinging on a curb with high probability, and that the set speed value has to be corrected immediately. Starting from this time, the set speed value is changed to that virtual set speed value which corresponds to the virtual vehicle speed or reaction B1 or to the virtual curb G—that is to say, a change to the set value B and a continuation of the maneuver with this set value take place, a significantly lower vehicle speed being demanded in order to avoid excessive vehicle speeds.

Figure 2D:
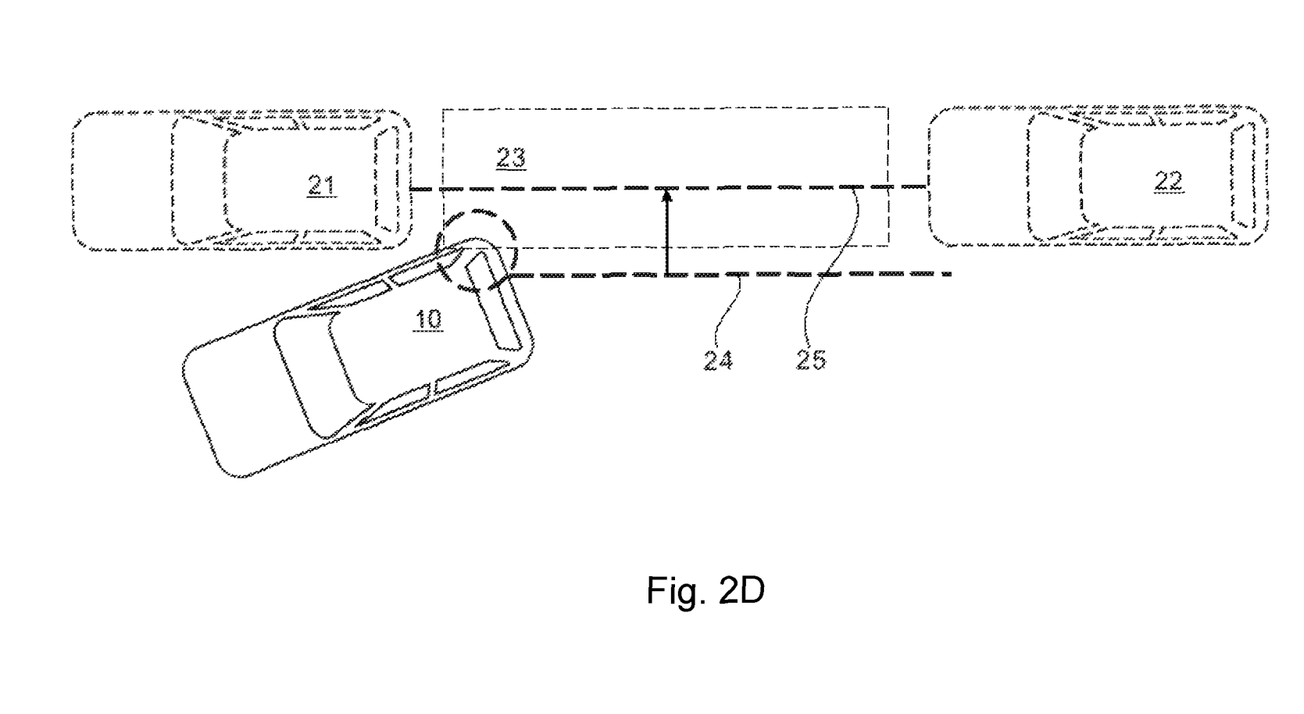

FIG. 2D shows the vehicle position within the parking space in the course of impinging on a real curb which is positioned in the vicinity of the virtual curb 24.

The accuracy of the method and of the device according to the disclosure can be controlled by specification of a larger or smaller number of virtual curbs. For example, the number of virtual curbs can be determined as a function of the dimensions of the parking space. The tighter the parking space, the more virtual curbs can be used. The virtual curbs do not have to be located at the exact position of real curbs. Rather, in accordance with the disclosure it is possible to determine the most probable scenario. In the present example, on the assumption that the observed vehicle speed still tallies with the main vehicle speed or vehicle reaction when the vehicle is traveling past the virtual curb G, shortly after the passing of the virtual curb G (for example, after a distance of 20 cm) this virtual curb G can be ignored, wherein a focusing on the virtual curb F takes place. By this means, the computation effort can be reduced.

Figure 3:
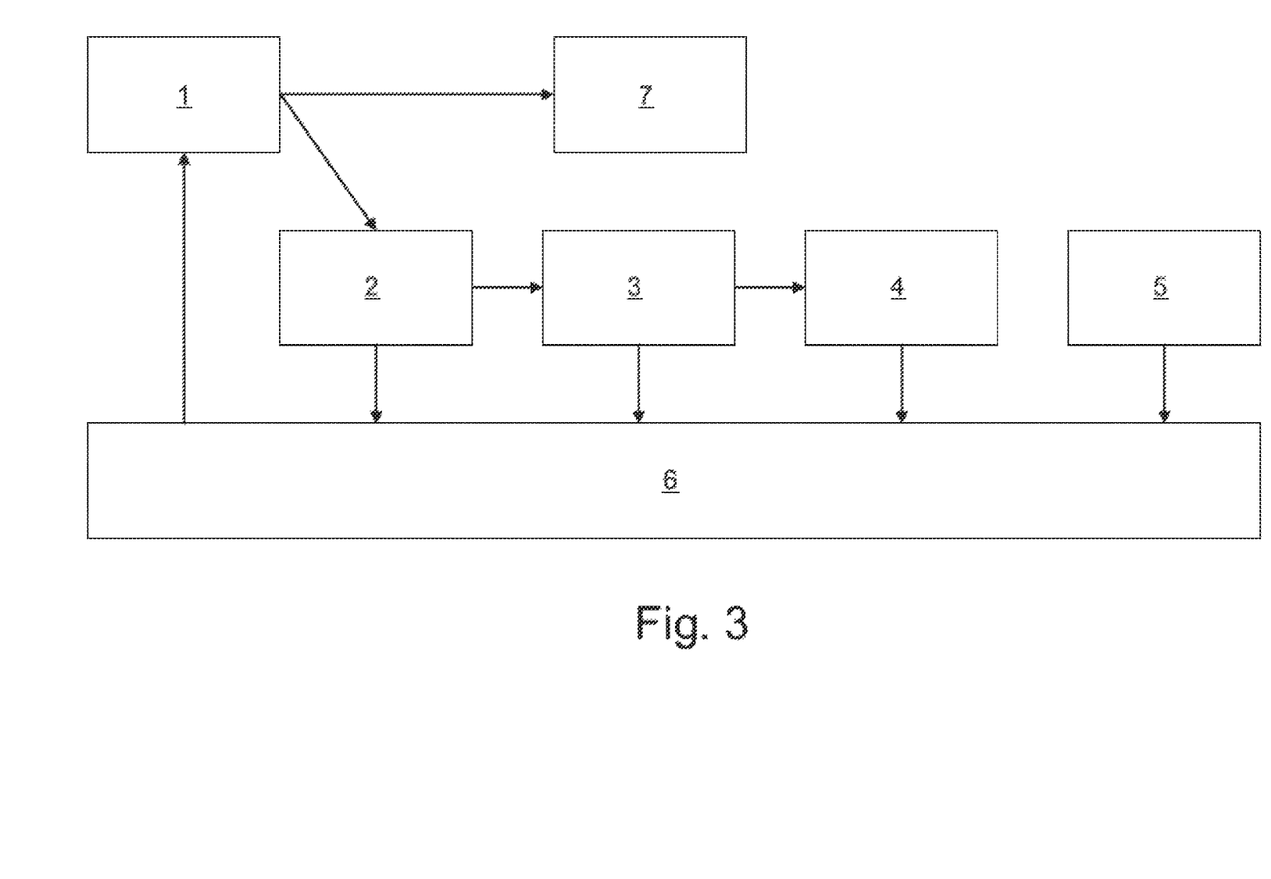
FIG. 3 is an overview diagram for elucidating components that are present in the device according to the disclosure.

FIG. 3 shows an overview diagram for elucidating components that are present in the device according to the disclosure. A unit for controlling the search phase or the reconnoitering of the respective parking space and for access to the respective properties of the parking space is denoted by 1. In the exemplary embodiment, in this case the respective set speed values can also be provided for the control of the vehicle. A module 2 serves for specifying or positioning the virtual curbs. On the basis of the signals provided by module 2, the calculation of the set speed values (both the main set speed value and the virtual set speed values) takes place in a module 3. On the basis of these set speed values, the estimation of the respective vehicle reaction or of the respective vehicle speed (both the main vehicle speed and the virtual vehicle speed) takes place in module 4. An appliance for monitoring or observing the current vehicle speed and the current vehicle position is denoted by 5. On the basis of the signals provided by the modules and appliances 2-5, the capture or ascertainment of a curb and also the corresponding adaptation of the set speed values take place in module 6. The corresponding vehicle-control appliances are denoted by 7.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for assisting a parking maneuver of a vehicle comprising:
    implementing an automated parking maneuver based on predetermined set speed values for vehicle motion;
    storing a plurality of virtual curbs, wherein each virtual curb of the plurality of virtual curbs differ in position and height, and virtual set speed values and virtual vehicle speeds;
    modifying at least one of the set speed values during the implementation of the parking maneuver based on a virtual curb of the plurality of virtual curbs;
    ascertaining an associated virtual set speed value for each virtual curb; and
    estimating a virtual vehicle speed based on a reaction of the vehicle to the virtual curb and to the associated virtual set speed value, wherein the modifying of the set speed values is based on a comparison between a current vehicle speed and the estimated virtual vehicle speed.

2. The method as claimed in claim 1, wherein ascertaining an associated virtual set speed value is defined according to a function of one or more of a position or a height of the virtual curb.

3. The method as claimed in claim 1 further comprising replacing a currently predetermined set speed value with a previously ascertained virtual set speed value based on a comparison between a current vehicle speed and an estimated virtual vehicle speed.

4. The method as claimed in claim 1 further comprising choosing a number of the plurality of virtual curbs from the plurality of virtual curbs depending on currently existing parking conditions.

5. A parking assist system comprising:
   an appliance configured to monitor a current vehicle speed and a current vehicle position; and
   a device, to reconnoiter a parking space and access properties of the parking space, configured to
   specify a virtual curb from a plurality of virtual curbs that differ in position and height,
   calculate a plurality of predetermined, set speed values based on the virtual curb,
   estimate a vehicle speed from a comparison between the current vehicle speed and a virtual vehicle speed, and,
   ascertain a curb and adapt the set speed values to maneuver the current vehicle position into the parking space based on the virtual curb, the plurality of speed values, the estimated vehicle speed, and the current vehicle speed and the current vehicle position.

6. The system as claimed in claim 5, wherein the device is further configured to calculate set speed values for a main set speed value and a virtual set speed value.

7. The system as claimed in claim 5, wherein the virtual curb includes defined properties corresponding to properties of the parking space.

8. The system as claimed in claim 7, wherein the set speed values are associated with the defined properties of the virtual curb.

9. A parking assist method comprising:
   modifying designated and predetermined set speed values, the values being based on a comparison between a current vehicle speed and an estimated virtual vehicle speed from a reaction to a virtual curb at a virtual set speed associated with the virtual curb, based on defined virtual curb properties such that a vehicle position is altered to maneuver within an identified parking space having the defined virtual curb properties.

10. The parking assist method of claim 9, wherein the virtual curb includes a plurality of virtual curbs, each having defined virtual curb properties including different positions and heights.

11. The parking assist method of claim 10 further comprising choosing a defined virtual curb from the plurality of virtual curbs, wherein the defined virtual curb has defined virtual curb properties corresponding to conditions of the identified parking space.

12. The parking assist method of claim 9, wherein further comprising replacing a currently predetermined set speed value with a previously ascertained virtual set speed value based on the comparison between a current vehicle speed and the estimated virtual vehicle speed.

* * * * *